United States Patent
Dull

(10) Patent No.: US 8,940,222 B2
(45) Date of Patent: Jan. 27, 2015

(54) HIGH FLOW EDGE BREATHER AND METHOD

(75) Inventor: Kenneth Marvin Dull, Pullayup, WA (US)

(73) Assignee: The Boeing Company, Chicago, IL (US)

( * ) Notice: Subject to any disclaimer, the term of this patent is extended or adjusted under 35 U.S.C. 154(b) by 435 days.

(21) Appl. No.: 13/288,523

(22) Filed: Nov. 3, 2011

(65) Prior Publication Data

US 2013/0113142 A1    May 9, 2013

(51) Int. Cl.
    *B29C 51/10*    (2006.01)
    *B29C 51/14*    (2006.01)
    *B29C 70/34*    (2006.01)
    *B29C 37/00*    (2006.01)

(52) U.S. Cl.
    CPC ........... *B29C 70/342* (2013.01); *B29C 37/0064* (2013.01); *Y02T 50/433* (2013.01); *Y02T 50/43* (2013.01)
    USPC .......................................... 264/511; 264/571

(58) Field of Classification Search
    None
    See application file for complete search history.

(56) References Cited

U.S. PATENT DOCUMENTS

| | | | |
|---|---|---|---|
| 3,793,422 A | 2/1974 | Johnston | |
| 3,810,815 A | 5/1974 | Welhart et al. | |
| 4,216,047 A | 8/1980 | Hilliard et al. | |
| 4,548,859 A | 10/1985 | Kline et al. | |
| 4,622,091 A | 11/1986 | Letterman | |
| 5,593,633 A | 1/1997 | Dull et al. | |
| 7,438,843 B2 | 10/2008 | Asgeirsson | |
| 2008/0004715 A1 | 1/2008 | Asgeirsson | |
| 2008/0261014 A1* | 10/2008 | McGuire et al. | 428/297.1 |
| 2010/0291258 A1 | 11/2010 | Dull et al. | |
| 2012/0298296 A1* | 11/2012 | Thompson et al. | 156/285 |

FOREIGN PATENT DOCUMENTS

| | | | |
|---|---|---|---|
| EP | 0909845 A1 | 4/1999 | |
| GB | 2238977 A | 6/1991 | |
| WO | WO91/14564 A1 | 10/1991 | |
| WO | WO2006005110 A1 | 1/2006 | |

OTHER PUBLICATIONS

EP search report dated Mar. 19, 2013 regarding application 12184611.7-1706, reference 1284P462EP MW, applicant The Boeing Company, 7 pages.

* cited by examiner

*Primary Examiner* — Monica Huson
(74) *Attorney, Agent, or Firm* — Yee & Associates, P.C.

(57) ABSTRACT

A breather for vacuum bag processing of a part comprises a sleeve of resilient material placed around the part.

13 Claims, 6 Drawing Sheets

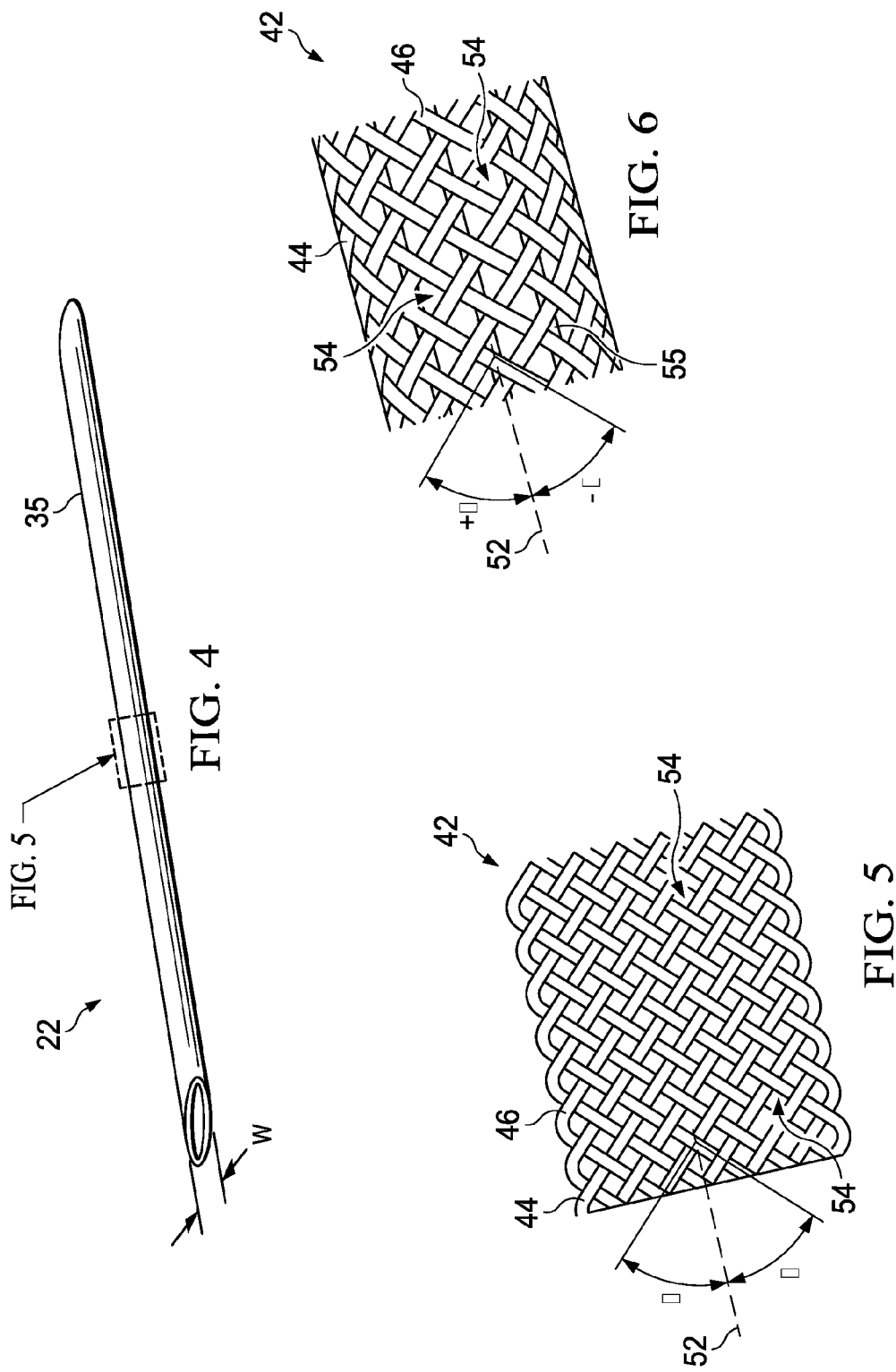

HIGH FLOW EDGE BREATHER AND METHOD

BACKGROUND INFORMATION

1. Field

The present disclosure generally relates to equipment and supplies used to fabricate composite parts, and deals more particularly with a high flow edge breather used in vacuum processing of composite layups.

2. Background

During the fabrication of composite parts, edge breathers may be positioned around the edges of a part layup that is subsequently processed under vacuum beneath a sealed vacuum bag. The breather provides a generally uniform breathing path around the periphery of the part layup which allows air and volatiles to escape from the part during compaction and curing processing cycles. Removing air and volatiles is desirable to reduce part porosity and improve part performance.

The ability of an edge breather to remove air and volatiles may be reduced when heat and pressure are applied to the vacuum bag, which tends to compress the edge breather, preventing it from breathing and/or isolating it from vacuum pressure. Known edge breathers may not have sufficient resilience to react the applied compaction pressure, resulting in reduced flow, even after heat and pressure are removed. These edge breathers may comprise polyester or nylon, non-woven materials in various weights, and woven fiberglass fabrics that are cut-to-size for a particular application. Because of their limited resiliency and tendency to remain compacted after a process cycle, these prior edge breathers may be subject to reduced flow under heat and pressure, and may not be reused.

Accordingly, there is a need for a high flow edge breather that has the resiliency needed to resist compaction pressures and which allows high flow-rate escape of air and volatiles from a part layup during a curing cycle. There is also a need for an improved edge breather that may be reused and/or used throughout multiple process cycles.

SUMMARY

The disclosed embodiments provide a high flow edge breather for removing air and volatiles from a part layup when subjected to heat and pressure applied by a vacuum bag. The breather may reduce or eliminate isolation of the breather from the applied vacuum pressure. The edge breather may be easily installed during assembly of the vacuum bag processing components, and may reduce waste of breather materials. Following a process cycle, the edge breather retains its hi-flow breathing characteristics as a result of its resiliency, and substantially returns to its previously uncompressed shape when heat and compaction pressure are removed. The edge breather may therefore be used in multiple process cycles required to fabricate a particular part, and/or used to cure multiple parts in successive curing operations.

According to one disclosed embodiment, an edge breather is provided for vacuum processing a composite part, comprising a sleeve of material adapted to be placed around the edges of the part. The sleeve of material is substantially foraminous, and includes a plurality of interstices allowing air and volatiles to pass therethrough when a vacuum is drawn on the part. The sleeve of material may comprise braided fibers of a thermoplastic.

According to another embodiment, a breather for processing composite parts comprises a sleeve formed of resilient braided fibers. The fibers may comprise a thermoplastic. The sleeve includes first and second, generally folded layers joined along their respective edges.

According to a further embodiment, an edge breather for vacuum bag processing composite part layups comprises a sleeve formed of resilient braided fibers, wherein the sleeve includes curves extending around the part layup. The curves are at corners of the part layup.

According to another embodiment, a method is provided of allowing air and volatiles to escape from a composite part being compacted by a flexible vacuum bag. The method comprises placing a sleeve of foraminous material around the part beneath the bag, and using the sleeve as an edge breather allowing the air and volatiles to pass therethrough around the edges of the part. The method may further comprise wrapping the sleeve around corners of the part by folding the sleeve over onto its self. The method also may include reusing the sleeve to successively process each of a plurality of parts.

According to still another embodiment, a method is provided of fabricating a composite part. The method comprises placing a part layup on a tool and placing a resilient breather sleeve on the tool around the part layup. A flexible bag is placed over the part layup and the breather sleeve. The flexible bag is sealed to the tool around the periphery of the breather sleeve, and a vacuum is drawn in the bag to compact the part layup and draw air and volatiles from the part layup. The method further comprises using the breather sleeve to allow the air and volatiles to escape from the edges of the part layup. Using the breather sleeve includes using the resiliency of the sleeve to prevent the breather sleeve from collapsing while a vacuum is drawn in the bag.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

FIG. 4 is an illustration of a perspective view of a length of the disclosed high flow edge breather, depicted in a slightly expanded state.

FIG. 5 is an illustration of the area designated as FIG. 5 in FIG. 4.

FIG. 6 is an illustration of a perspective view of an alternate form of the braided material.

DETAILED DESCRIPTION

Figure 1:
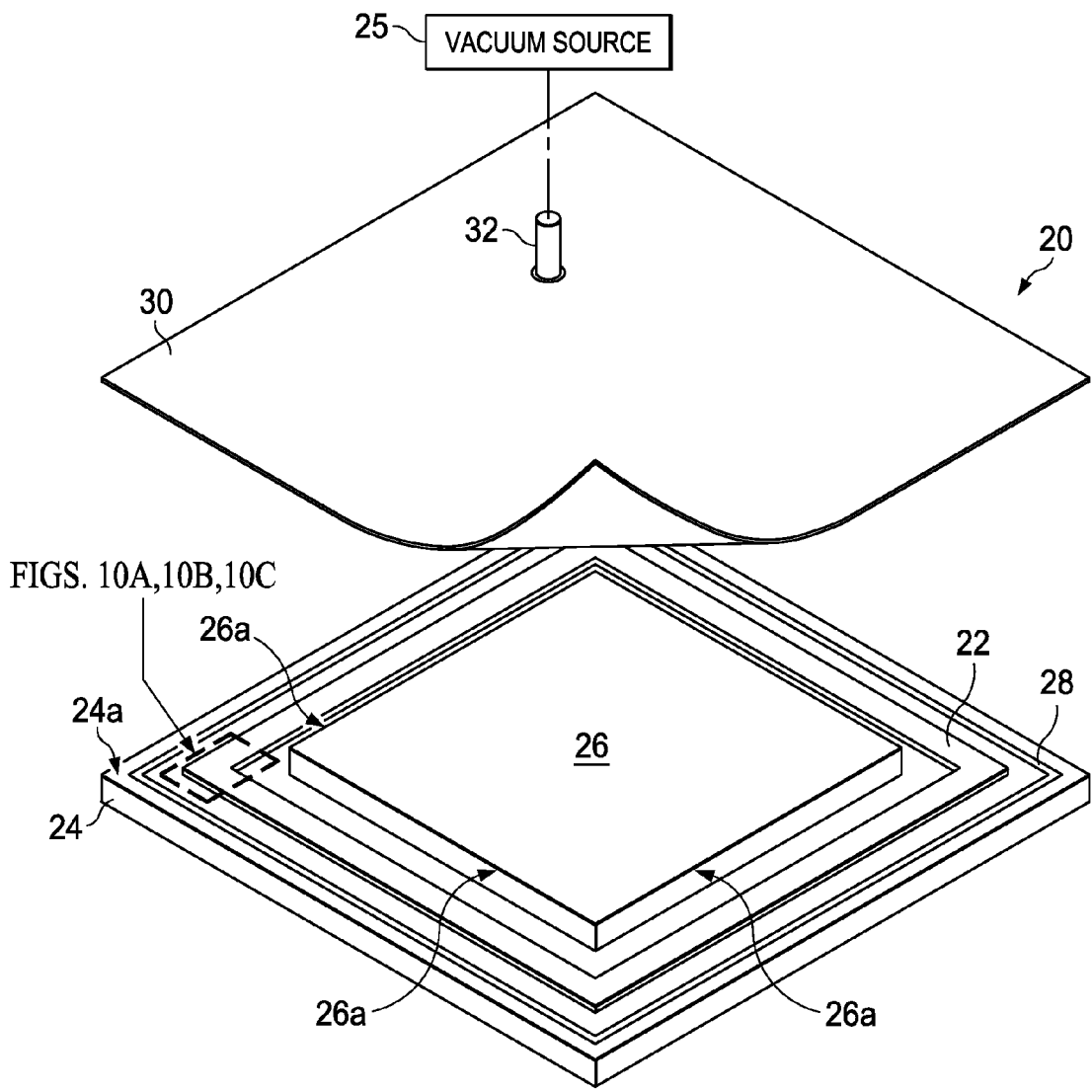
FIG. 1 is an illustration of a perspective view of certain components of a vacuum bag assembly employing a high flow edge breather according to the disclosed embodiments.

Referring first to FIG. 1, a vacuum bag assembly used to fabricate a composite part layup 26 broadly comprises a tool 24 having a tool surface 24a against which the part layup 26, which may comprise prepreg plies, is compacted by a vacuum bag 30. Vacuum bag 30 has one or more ports 32 connected to a vacuum source 25 that draws a vacuum in the bag 30 in order to debulk, compact and/or form the part layup 26 against the tool surface 24a. A peripheral seal 28, which may comprise a conventional sealant tape, forms a substantially air tight seal between the bag 30 and the tool surface 24a. In accordance with the disclosed embodiments, a high flow edge breather 22 is installed on the tool surface 24a, spaced between the part layup 26, and the peripheral seal 28, surrounding the part layup 26.

As will be discussed below, the edge breather allows air and volatiles to be withdrawn from the edges from the part layup 26 when a vacuum is drawn within the bag 30. The part layup 26 may also be heated when a vacuum is drawn within the bag 30. The same breather 22 used during the fabrication of the part layup 26, may be used again during curing the part layup 26. It should be noted here that while the breather 22 is shown in an application where a prepreg layup part is being fabricated, the breather 22 may be employed in other processes used to fabricate composite parts which require edge breathers, such as without limitation, resin infusion and vacuum infusion processes. Further, while the breather 22 may be particularly effective as an edge breather, it may also have application as a surface breather in some applications.

Figure 2:
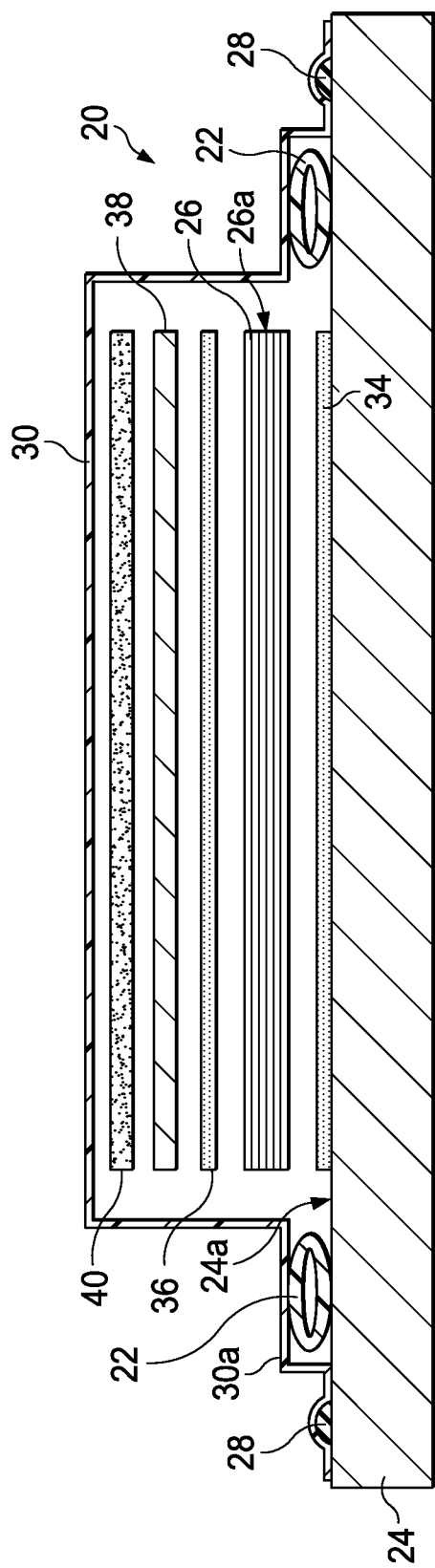
FIG. 2 is an illustration of a sectional view of a vacuum bag assembly, showing components of the layup assembly slightly exploded, prior to compression by a vacuum.

Referring now to FIG. 2, the vacuum bag assembly 20 further comprises a pair of peel plies 34, 36 on opposite sides of the layup 26, along with an optional caul plate 38 and a surface breather 40. The edge breather 22 is covered by a peripheral portion 30a of the bag 30 and is disposed between the part layup 26 and the peripheral seal 28. As will be discussed below, the edge breather 22 comprises an elongate sleeve, shown slightly expanded for clarity in FIG. 2.

Figure 3:
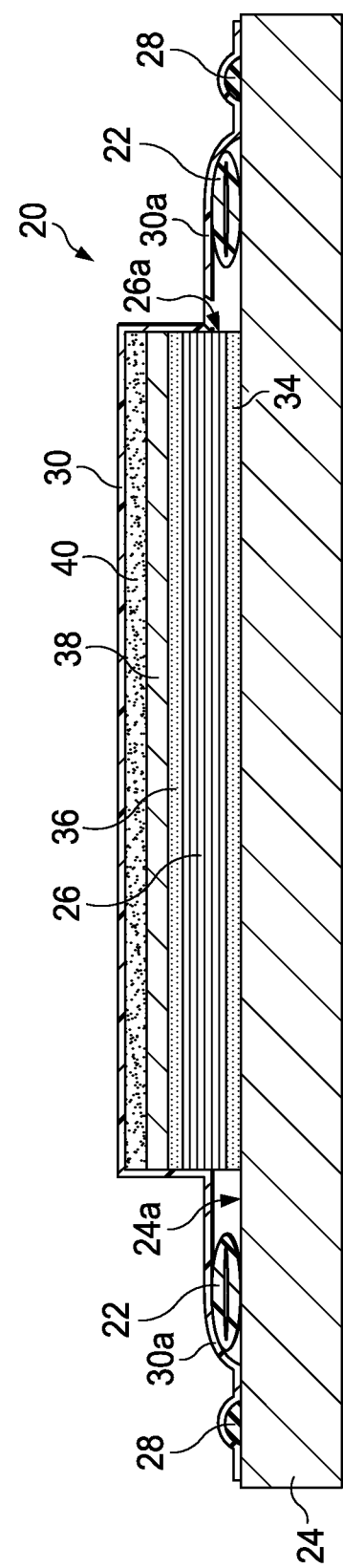
FIG. 3 is an illustration similar to FIG. 2 but showing a vacuum having been drawn in the bag, and the components of the assembly drawn down against a tool.

Referring to FIG. 3, when a vacuum is drawn in the bag 30, the bag 30 compresses the assembly of the peel plies 34, 36, part layup 26, caul plate 38 and breather 40 against the tool surface 24a. The edge breather 22 prevents the bag 30 from sealing against the tool surface 24a at the edges 26a of the part layup 26, and allows air and volatiles to escape from the part layup edges 26a and exit the vacuum bag 30 through one or more outlet ports 32 (FIG. 1).

Referring now to FIGS. 4 and 5, the high flow edge breather 22 comprises a foraminous and resilient, flexible sleeve 35 formed of a suitable tubular braided material 42 (FIG. 5), in a sleeve width W that is suitable for the application. The braided material 42 may be formed of flexible resilient fibers 44, 46 capable of withstanding the heat and pressure of the application. For example, and without limitation the fibers 44, 46 may comprise a suitable thermoplastic such as nylon, PET, PVC, polyolefin or a combination of differing thermoplastic materials. Other flexible, resilient fiber materials are possible. The fibers 44, 46 are braided in a manner to form interstices 54 between the diagonal fibers 44, 46. The interstices 54 allow air and volatiles to pass through the breather 22 as the sleeve 35 is compressed during heating and compaction part layup 26.

In one embodiment, the braided material 42 may comprise a biaxial braid construction in which two fibers (or two bundles of fibers, e.g. rovings) 44, 46 are braided together diagonally in an over-and-under basket weave. Each of the fibers 44, 46 has a preselected braid angle θ measured from a braid axis 52, and is substantially continuous along the length of the sleeve 35. The example shown in FIG. 5 is a two-dimensional braid, however a three dimensional braid (not shown) may be employed if desired, depending on the application, in which the fibers 44, 46 are also braided in layers (not shown) through thickness t (FIG. 7) of the sleeve 35. Braiding of the continuous fibers 44, 46 interlocks them in a helix configuration that advantageously absorbs and distributes compression loads imposed on the sleeve 35 as the vacuum bag 30 compresses the sleeve 35 downwardly against the tool surface 24a, providing the sleeve 35 with spring-like resiliency.

FIG. 6 illustrates another embodiment of a braided material 42 that may be used to form the breather sleeve 35. In this example, a third axial fiber 55 is braided along with the diagonal fibers 44, 46 to form a triaxial braided material 42. A variety of other braiding arrangements are possible which result in a resilient sleeve 35 having interstices 54 (FIGS. 5 and 6) that allow passage of air and volatiles through the edge breather 22. While braided material 42 has been illustrated, it may be possible to fabricate the sleeve using other techniques for interlacing or combining fibers that result in a flexible sleeve that is foraminous and resilient.

Figure 7:
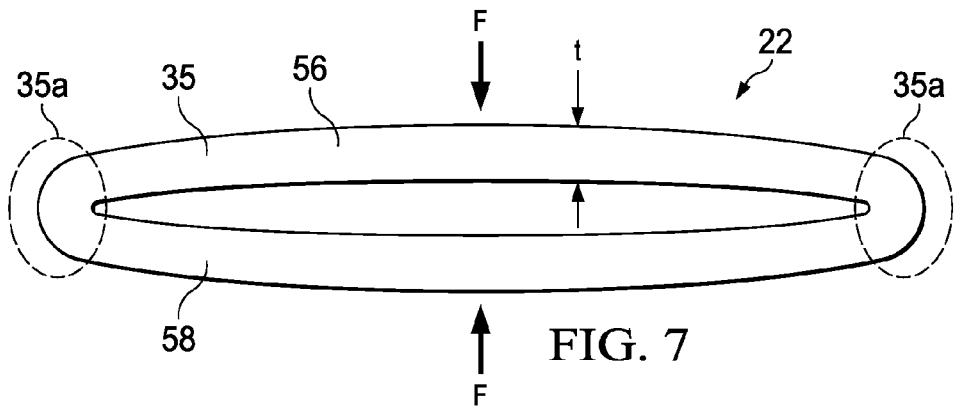
FIG. 7 is an end view of the braided sleeve shown in FIG. 4, in a slightly expanded condition.
Figure 8:
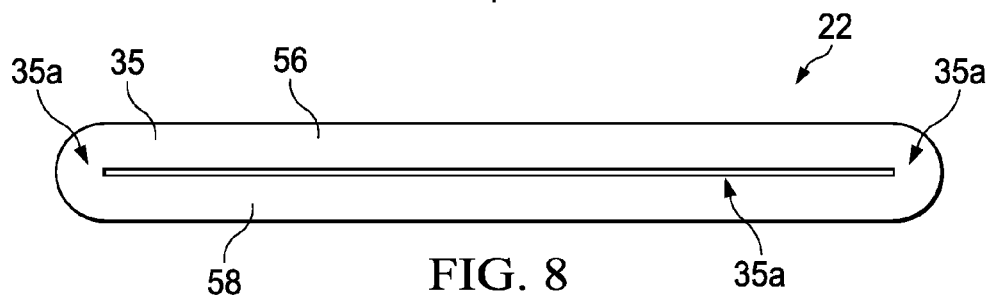
FIG. 8 is an illustration similar to FIG. 7 but showing the braided sleeve in a fully collapsed, compacted condition.

In FIG. 7, the breather 22 is shown slightly expanded state to illustrate that the sleeve 35 has a flatted tubular cross sectional shape, formed by overlying layers 56, 58 connected continuously along their edges 35a. The use of a braided material 42 provide the braided sleeve 35 with the degree of resiliency needed to resist permanent compaction which may reduce flow through the breather 22. FIG. 8 illustrates the braided sleeve 35 in a partially compressed state, under vacuum pressure from an overlying vacuum bag 30 (FIG. 3).

Figure 9:
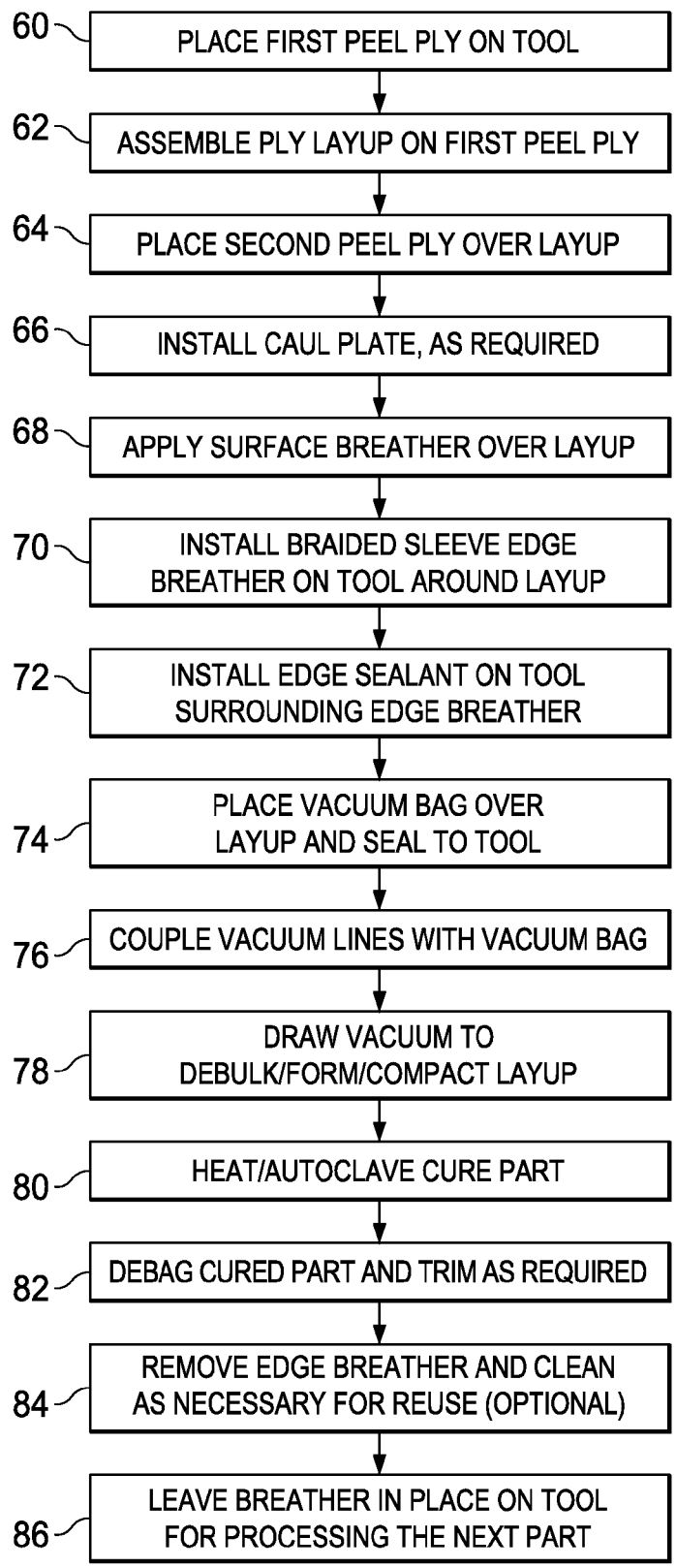
FIG. 9 is an illustration of a flow diagram of a method of fabricating composite parts using the disclosed high flow edge breather.

Attention is now directed to FIG. 9 which illustrates the steps of a method of fabricating composite parts using the high flow edge breather 22 described above. Beginning at step 60, a first peel ply 34 is placed on a tool surface 24a, following which the ply layup 26 may be assembled on the first peel ply, as shown at step 62. At 64, a second peel ply 36 is placed over the part layup 26 and at 66, an optional caul plate 38 may be installed, as required. At step 68, a surface breather 40 is applied over the part layup 26, and at 70, the disclosed high flow edge breather 22 is installed on the tool surface 24a, surrounding the edges 26a of the part layup 26. In some embodiments, the high flow edge breather 22 may be installed on the tool surface 24a (step 70) before the surface breather 40 is applied in step 68. At 72, an edge sealant 28 or other suitable seal is applied to the tool surface 24a surrounding the edge breather 22. At 74, a vacuum bag 30 is placed over the part layup 26 and sealed to the tool surface 24a using the seal 28. At 76, a vacuum source 25 is coupled with the vacuum bag 30, and at 78, a vacuum is drawn within the bag 30 to debulk, form and/or compact the part layup 26 either with or without the application of heat. At 80, the vacuum bag assembly 20 may be placed in an autoclave (not shown) where heat and pressure are applied in order to cure the part layup 26. At 82, the cured part is debagged and trimmed as required. Optionally, at 84, the edge breather 22 may be removed and cleaned as necessary for reuse. At 86, the edge breather 22 may be left in place for reuse in processing one or more additional parts.

Figure 10A:
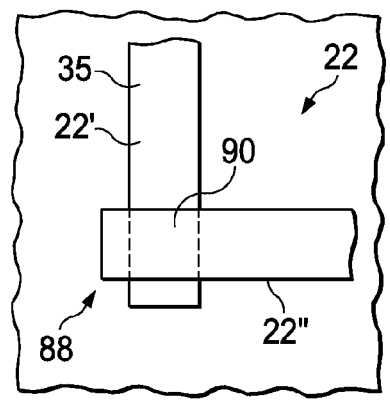
FIGS. 10A, 10B and 10C are illustrations of the area designated as FIGS. 10A, 10B, in FIG. 1, respectively showing three techniques for installing the breather on the tool.
Figure 10B:
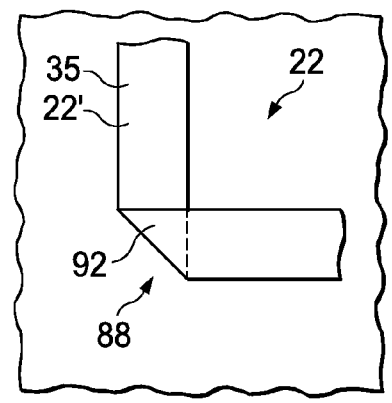
Figure 10C:
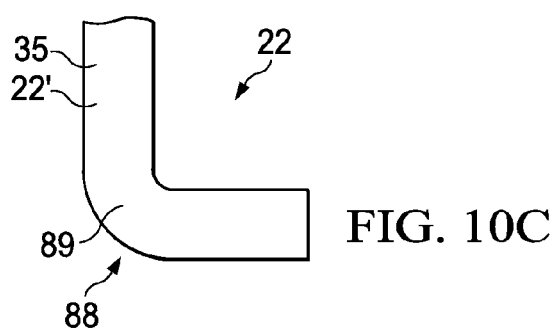

FIGS. 10A, 10B and 10C respectively illustrate two techniques for installing the high flow edge breather on the tool 24, shown as step 70 in FIG. 9. Referring to FIG. 10A, a continuous length (FIG. 4) of a braided sleeve 35 of the type previously may be cut into separate strips 22', 22", and overlapped 90 at the corners 88 of the breather 22. Alternatively, as shown in FIG. 10B, a single continuous length of a braided sleeve 35 may be folded over 92 onto itself, on each of the corners 88. Referring to FIG. 10C, depending on the outline shape of the part layup 26 and the size/geometry of the tool 24, a continuous length of the braided sleeve 35 may be bent into one or more curvatures or curved 89 at the corners 88, thus avoiding the need to cut or fold the braided sleeve 35. The braided sleeve 35 may be held in place on the tool surface 24a by a suitable pressure sensitive tape (not shown).

Figure 11:
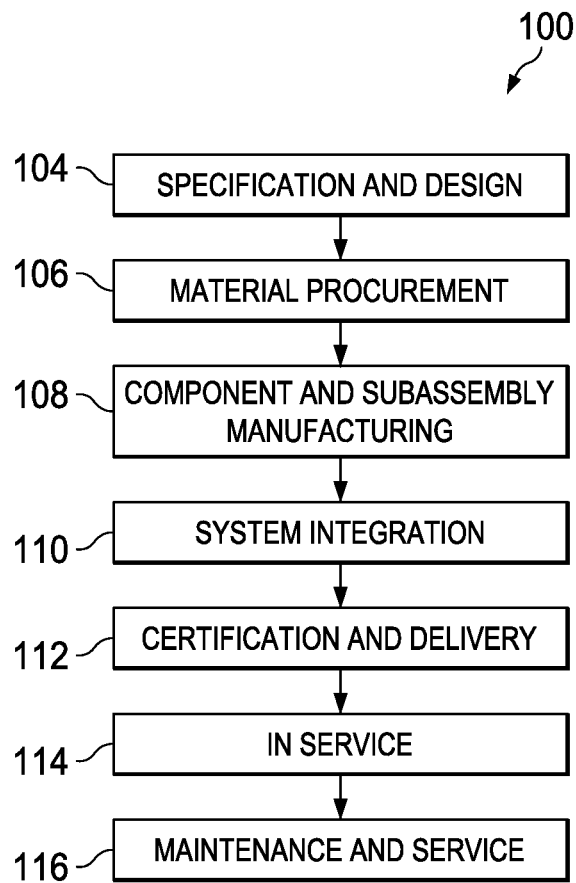
FIG. 11 is an illustration of a flow diagram of aircraft production and service methodology.
Figure 12:
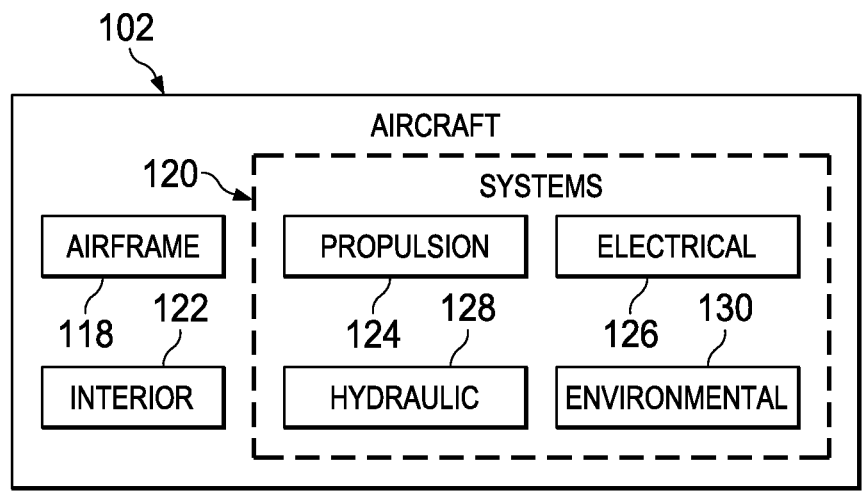
FIG. 12 is an illustration of a block diagram of an aircraft.

Embodiments of the disclosure may find use in a variety of potential applications, particularly in the transportation industry, including for example, aerospace, marine, automotive applications and other application where automated layup equipment may be used. Thus, referring now to FIGS. 11 and 12, embodiments of the disclosure may be used in the context of an aircraft manufacturing and service method 100 as shown in FIG. 11 and an aircraft 102 as shown in FIG. 12. Aircraft applications of the disclosed embodiments may include, for example, without limitation, layup, compaction and curing any of a wide range of composite parts and components, such as stiffener members including beams, spars and stringers, to name only a few. During pre-production, exemplary method 100 may include specification and design 104 of the aircraft 102 and material procurement 106. During production, component and subassembly manufacturing 108 and system integration 110 of the aircraft 102 takes place. Thereafter, the aircraft 102 may go through certification and delivery 112 in order to be placed in service 114. While in service by a customer, the aircraft 102 is scheduled for routine maintenance and service 116, which may also include modification, reconfiguration, refurbishment, and so on.

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 12 the aircraft 102 produced by exemplary method 100 may include an airframe 118 with a plurality of systems 120 and an interior 122. Examples of high-level systems 120 include one or more of a propulsion system 124, an electrical system 126, a hydraulic system 128, and an environmental system 130. Any number of other systems may be included. Although an aerospace example is shown, the principles of the disclosure may be applied to other industries, such as the marine and automotive industries.

Systems and methods embodied herein may be employed during any one or more of the stages of the production and service method 100. For example, components or subassemblies corresponding to production process 108 may be fabricated or manufactured in a manner similar to components or subassemblies produced while the aircraft 102 is in service. Also, one or more apparatus embodiments, method embodiments, or a combination thereof may be utilized during the production stages 108 and 110, for example, by substantially expediting assembly of or reducing the cost of an aircraft 102. Similarly, one or more of apparatus embodiments, method embodiments, or a combination thereof may be utilized while the aircraft 102 is in service, for example and without limitation, to maintenance and service 116.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for allowing air and volatiles to escape from a composite part on a tool surface being compacted by a flexible vacuum bag, the method comprising:
   placing an edge breather on the tool surface around the composite part inside the flexible vacuum bag, the edge breather comprising a sleeve of foraminous woven material having a substantially tubular form and positioned between the composite part and a seal, wherein the sleeve of foraminous woven material comprises a braid of at least two thermoplastic fibers; and
   allowing the air and volatiles to pass through the sleeve of foraminous material from edges of the composite part.

2. The method of claim 1, further comprising:
   wrapping the sleeve around corners of the composite part by folding the sleeve over onto itself.

3. The method of claim 1, further comprising:
   wrapping the sleeve around corners of the composite part by bending the sleeve into curves at the corners.

4. The method of claim 1, further comprising:
   reusing the sleeve as a breather to successively process a plurality of parts.

5. A method for fabricating a composite part, the method comprising:
   placing a part layup including a composite part on a tool;
   installing a resilient breather sleeve on the tool around the part layup, the resilient breather sleeve comprising a foraminous woven material having a tubular form, wherein the resilient breather sleeve of foraminous woven material comprises a braid of at least two thermoplastic fibers;
   placing a flexible bag over the part layup and the resilient breather sleeve;
   sealing the flexible bag to the tool around a periphery of the part layup with a seal, the resilient breather sleeve spaced between the seal and the part layup;
   drawing a vacuum in the flexible bag to compact the part layup and draw air and volatile from the part layup; and
   using the resilient breather sleeve to allow the air and volatiles to escape from the edges of the part layup.

6. The method of claim 5, wherein using the resilient breather sleeve includes using the resiliency of the resilient breather sleeve to prevent the breather sleeve from collapsing while a vacuum is drawn in the flexible bag.

7. The method of claim 5, further comprising:
   using the resilient breather sleeve as an end breather to successively process multiple parts.

8. The method of claim 5, further comprising:
using the resilient breather sleeve as an end breather during multiple process cycles for processing the part cycles in which a vacuum is drawn and then released in at least two of the process cycles.

9. The method of claim 5, further comprising:
cutting a length of the resilient breather sleeve from a supply thereof, and
arranging cut lengths of the resilient breather sleeve on the tool around edges of the part.

10. The method of claim 1, wherein the sleeve of foraminous woven material comprises a braid of three thermoplastic fibers.

11. The method of claim 1, wherein the thermoplastic fibers are selected from the group consisting of nylon, PET, PVC, and polyolefin.

12. A method for vacuum bagging a composite part, the method comprising the steps of:
placing a first peel ply on the tool;
placing a composite part on the first peel ply;
placing a second peel ply on the composite part;
placing a caul plate on the second peel ply;
placing an edge breather on the tool so as to surround the composite part, the edge breather comprising a braid of thermoplastic fibers in substantially tubular form;
placing a surface breather on the caul plate, the surface breather separate from the edge breather;
sealing a vacuum bag over the composite part with a seal, the edge breather positioned between the seal and the composite part; and
drawing a vacuum in the vacuum bag so as to compact the composite part.

13. The method of claim 12 further comprising reusing the edge breather in a subsequent vacuum bagging operation.

* * * * *